(12) United States Patent
Lassanske et al.

(10) Patent No.: US 6,516,986 B1
(45) Date of Patent: Feb. 11, 2003

(54) SUPPORT SYSTEM FOR A VEHICLE-MOUNTED EQUIPMENT CARRIER

(75) Inventors: Todd W. Lassanske, Ridgeway, WI (US); Joseph J. Schachtner, Deer Park, WI (US); Neil T. Amundsen, Minneapolis, MN (US)

(73) Assignee: Graber Products, Inc., Madison, WI (US)

( * ) Notice: Subject to any disclaimer, the term of this patent is extended or adjusted under 35 U.S.C. 154(b) by 0 days.

(21) Appl. No.: 09/668,437

(22) Filed: Sep. 22, 2000

(51) Int. Cl.$^7$ ............................. B60R 9/00
(52) U.S. Cl. ............... 224/533; 224/502; 224/505; 224/531; 224/532; 224/535; 224/924
(58) Field of Search ................. 224/533, 531, 224/532, 535, 536, 537, 522, 523, 502, 545, 924

(56) References Cited

U.S. PATENT DOCUMENTS 562,520 A    6/1896   Fonda

FOREIGN PATENT DOCUMENTS

GB    2278819    12/1994

OTHER PUBLICATIONS

"Spare Logic #SL2000B: Two–Bike Spare Tire Mount Carrier" brochure, Bard Wyers Sports, Inc.

(List continued on next page.)

Primary Examiner—Stephen P. Garbe
Assistant Examiner—Maerena W. Brevard
(74) Attorney, Agent, or Firm—Boyle, Fredrickson, Newholm, Stein & Gratz, S.C.

(57) ABSTRACT

A support assembly for supporting an article on a vehicle-mounted equipment carrier having an axially-extending mounting member generally includes a first support member, a second support member and a locking member, all of which define openings or passages within which the carrier mounting member is received. The first support member includes a hub section from which a pair of arms extend, and the arms include first and second support areas for engaging the article at a pair of spaced locations. The second support member includes a hub section which is engageable with the hub section of the first support member, and an arm extending therefrom and including a third support area. The locking member extends through the hub section of the second support member and is engageable with the hub section of the first support member, for selectively fixing the position of the second support member arm relative to the first support member arms, and for simultaneously securing the support assembly to the carrier-mounting member. The first support member includes a series of outwardly biased locking fingers which are engaged by the locking member as the locking member is moved into engagement with the hub section of the first support member, for urging the locking fingers into engagement with the carrier mounting member so as to secure the support assembly in position on the carrier mounting member. The first and second support members can be positioned in various configurations so as to enable the support assembly to support differently configured articles, such as bicycles having a variety of different frame styles.

62 Claims, 7 Drawing Sheets

U.S. PATENT DOCUMENTS

| | | | |
|---|---|---|---|
| 577,910 | A | 3/1897 | Bierbach |
| 2,512,267 | A | 6/1950 | Donnelley |
| 2,803,349 | A | 8/1957 | Talbot |
| 3,794,227 | A | 2/1974 | Stearns |
| 3,877,622 | A | 4/1975 | McLain |
| 4,116,341 | A | 9/1978 | Hebda |
| 4,452,385 | A | 6/1984 | Prosen |
| 4,513,897 | A | 4/1985 | Graber |
| 4,676,414 | A | 6/1987 | Deguevara |
| 4,875,608 | A | 10/1989 | Graber |
| 4,948,021 | A | 8/1990 | Murphy et al. |
| 4,997,116 | A | 3/1991 | Grim |
| 5,004,133 | A | 4/1991 | Wyers |
| 5,056,700 | A | 10/1991 | Blackburn et al. |
| 5,190,195 | A | 3/1993 | Fullhart et al. |
| 5,211,323 | A | 5/1993 | Chimenti et al. |
| 5,259,542 | A | 11/1993 | Newbold et al. |
| 5,282,555 | A | 2/1994 | Muir et al. |
| 5,284,282 | A | 2/1994 | Mottino |
| 5,303,857 | A | 4/1994 | Hewson |
| 5,305,936 | A | 4/1994 | Nusbaum |
| 5,330,084 | A | 7/1994 | Peters |
| 5,385,280 | A | 1/1995 | Littlepage et al. |
| 5,505,357 | A | 4/1996 | Chimenti et al. |
| 5,573,165 | A | 11/1996 | Bloemer et al. |
| 5,775,555 | A | 7/1998 | Bloemer et al. |
| 5,938,093 | A * | 8/1999 | Bloemer et al. ............ 224/553 |
| 6,062,451 | A * | 5/2000 | Lassanske et al. .......... 224/502 |

OTHER PUBLICATIONS

"Quik Hitch #T–QH–4000: Multi–Fit 2 & 4 Bike Trailer Hitch Systems" brochure, Bard Wyers Sports, Inc.
"Voyager Rak #VTR2000: Two–Bike Trunk–Mount Carrier" brochure, Bard Wyers Sports, Inc.
"Ski Logic #SLK4000: Ski Carrier System (4 pairs)" brochure, Bard Wyers Sports, Inc.
Graber USA 1995 Product Information and Compatibility Guide.
"T–REX Raks Easy to Use Built to Last", advertisement.
Slider Corp. Product Guide 1994, Slider Corp.
Draft Master Sport Racks, brochure, ANEW Development, Inc., Oregon.
1995 Rhode Gear catalog, 1994 Rhode Gear.
"Hollywood Racks: Simple. Strong. Secure. 1994 Master Fit List" brochure.
1994 Thule catalog.
Allen 143A brochure, R.A. Allen Co., Inc., Lincoln, MA.
Allen 104A brochure, R.A. Allen Co., Inc., Lincoln, MA.
Allen 103A brochure, R.A. Allen Co., Inc., Lincoln, MA.
Stealth Rak #SR3000: Bumper–Mounted, 3–Bike Carrier brochure, Bard Wyers Sports, Inc.
"Mini Stealth #MS2000: Two–Bike Bumper–Mount Carrier" brochure, Bard Wyers Sports, Inc.
"U–Haul Need A Hitch?", advertisement, U–Haul Int'l, Jun. 1994.
Swagman, advertisement, Danik Industries, Ltd., British Columbia, Canada.
DMC Products Inc., Eugene, OR, advertisement from "Bicycle Retailer", Sep. 1994.
Piper Bike Racks Unsurpassed Stability. Advertisement, King Roof, Inc., Taiwan.
Rak N Loc,"Keep Your Bikes Absolutely Safe", advertisement, B&S Enterprises.
Newslines, pp. 132–133, "Rear–Rack Market Booms As Quality, Features Improve", Sep. 1994, newspaper article.
Roto–Eze Quality Towing Accessories, advertisement, Roto–Eze.
"Click–On" and Performance XPORT advertisements.
"Barrecrafters Hitch Mounts", advertisements, Barrecrafters 1994–95, Shelburne, VT.
"Mount'N Bike Rack Lowering System", advertisement, Mount'N Inc., Orem, Utah.
Hollywood Racks, "Quality and Innovation", advertisement, from Bicycle Retailer, Apr. 1994.

* cited by examiner

SUPPORT SYSTEM FOR A VEHICLE-MOUNTED EQUIPMENT CARRIER

BACKGROUND AND SUMMARY OF THE INVENTION

This invention relates to an apparatus and method for supporting an article, such as a bicycle, on a vehicle-mounted carrier.

Various vehicle-mounted rack or carrier constructions are known, and are typically employed to support articles, such as bicycles or other recreational equipment, on a vehicle. In a typical application, a hitch-mounted rack or carrier includes a mounting arrangement for engagement with the hitch of a vehicle. One type of rack or carrier is in the form of a tubular member defining an inverted L-shape, having an upright member extending upwardly from the mounting arrangement and a mounting section extending rearwardly from the upper end of the upright member. In order to support bicycles, skis or other equipment, a series of brackets or the like are engageable with the mounting section. Examples of such bracket constructions are shown and described in Bloemer et al U.S. Pat. No. 5,775,555 issued Jul. 7, 1998, the disclosure of which is hereby incorporated by reference. The '555 patent discloses a wing or bracket assembly which includes an opening for receiving the carrier mounting section, in combination with a clamping assembly including a pivotable locking handle for selectively clamping the wing or bracket onto the carrier mounting section. A pair of aligned support tabs are mounted one to each end of the wing or bracket, and are typically employed to engage the cross tube of a bicycle. A tube holder is pivotably mounted to each end of the wing or bracket, and defines a trough for engaging either the cross tube or a down tube of the bicycle frame. Engagement of the tube holder with the down tube prevents the bicycle from swaying when the bicycle is engaged with the wing or bracket.

While the above construction has been found to be satisfactory to mount bicycles or other articles to a vehicle-mounted equipment carrier, there are certain bicycle frame styles which cannot be supported using a wing or bracket constructed in this manner, such as bicycle frame styles designed for women or juveniles, as well as other specially configured bicycle frames. In addition, while the prior art design provides a certain amount of versatility in accommodating different frame styles and types of equipment, such flexibility is limited by the mounting of the tube supports to the ends of the wing or bracket.

It is an object of the present invention to provide a support assembly and method for a vehicle-mounted carrier, wherein the support assembly is capable of supporting a wide variety of bicycle frame styles, including women's and juvenile frame styles, as well as other types of specially configured bicycle frame styles. It is a further object of the invention to provide such a support assembly and method in which the support assembly can be quickly and easily reconfigured to accommodate different types of bicycle frames or other equipment. Yet another object of the invention is to provide such a support assembly and method in which the support assembly provides a stabilizing feature in its various configurations. Yet another object of the invention is to provide such a support assembly and method in which the support assembly incorporates an internal arrangement by which the support member is secured to the carrier mounting member. Yet another object of the invention is to provide such a support assembly and method in which the support assembly can be employed to support various types of equipment, such as bicycles or skis, simply by rearranging certain of the support assembly components relative to the other. Yet another object of the invention is to provide such a support assembly and method in which the support assembly is relatively simple in its components, construction and installation, yet which provides a highly advantageous, secure and flexible system for supporting various articles of equipment on a vehicle-mounted equipment carrier.

In accordance with the invention, a support assembly for a vehicle-mounted carrier having an outwardly extending mounting member generally includes a first support member, a second support member engageable with the first support member, and a locking member for selectively securing the first and second support members together. The first support member includes first and second fixed-position support or engagement areas for engaging a bicycle frame or other article at a pair of spaced locations. In a preferred form, the first support member includes a central hub and a pair of arms extending outwardly from the central hub. Each support area is provided on one of the arms. The hub defines an opening through which the carrier mounting member extends.

The second support member is movable to varying positions relative to the first support member, and includes a third support or engagement area separate from the first and second support engagement areas. The second support member can be moved to varying positions relative to the first support member, for varying the location of the third support area relative to the first and second support areas. In a preferred form, the second support member includes a central hub defining a passage, and an arm extending outwardly from the central hub. The third support area is provided on the arm, and the hub defines a passage through which the carrier mounting member extends. The hub of the second support member is engageable with the hub of the first support member, and the second support member hub can be rotated relative to the first support member hub so as to vary the angular position of the second support member arm, and thereby the third engagement area, relative to the arms of the first support member and thereby the first and second engagement areas.

The locking member is selectively engageable with the hub of the first support member and is also engageable with the hub of the second support member. In one form, the locking member extends through the passage defined by the hub of the second support member, and the locking member and the hub of the first support member include mating threads such that the locking member can be rotated and advanced toward the hub of the first support member. The hub of the second support member is clamped between the locking member and the hub of the first support member, so as to fix the position of the second support member relative to the first support member.

In addition, the first support member may include locking structure for selectively securing the support assembly to the carrier mounting member. In a preferred form, the locking structure includes a series of radially spaced axially extending fingers provided on the hub of the first support member, in combination with engagement structure provided on the locking member. Rotation of the locking member, to advance the locking member toward the hub of the first support member, results in engagement of the engagement structure with the locking fingers, which are normally biased to a position out of contact with the carrier mounting member. The engagement structure is configured such that, upon continued advancement of the locking member toward the first support member, the engagement structure forces the locking fingers inwardly into contact with the carrier mounting member, to frictionally engage the hub of the first support member with the carrier mounting member, and thereby to secure the support assembly in position on the carrier mounting member.

The third support or engagement area provided by the second support member can be moved to various positions relative to the first and second support or engagement areas of the first support member, according to the configuration of the bicycle frame or other article to be supported by the support assembly. In most cases, the third support area is engaged with a diagonal tube or down tube of the bicycle frame, to act as a stabilizer for preventing the bicycle from swaying or swinging relative to the carrier. With other frame constructions, the third support area can be positioned so as to cooperate with one of the first and second support areas so as to suspend the bicycle frame. The other of the first and second support areas is positioned so as to engage an upwardly extending member of the bicycle, such as the seat post, to provide stability against swaying or swinging motion.

The invention further contemplates a method of supporting an article on a vehicle-mounted equipment carrier, substantially in accordance with the foregoing summary.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings.

DETAILED DESCRIPTION OF THE INVENTION

Figure 1:
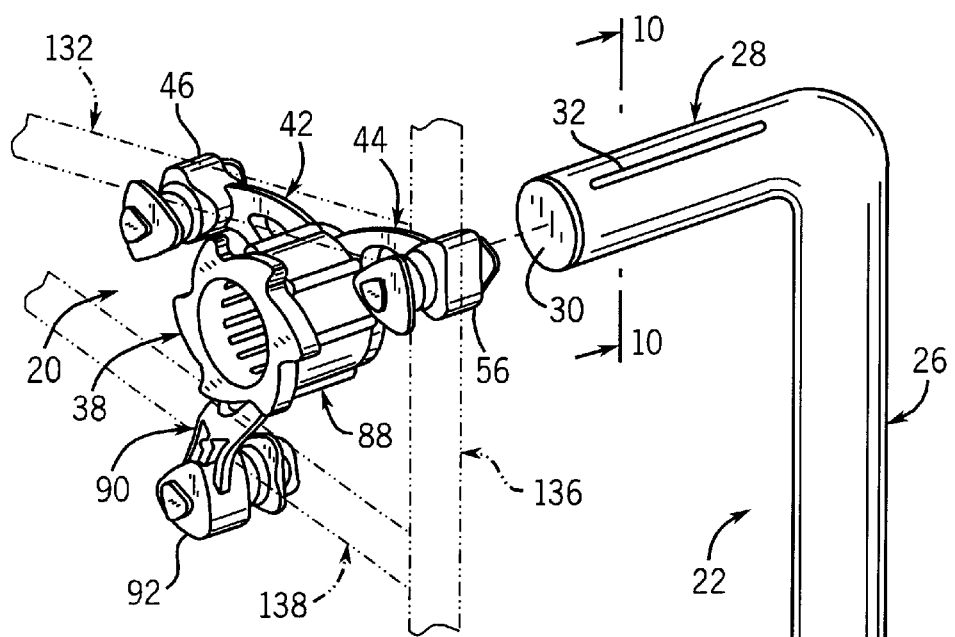
FIG. 1 is a partial isometric view illustrating a support assembly constructed according to the invention, for supporting a bicycle or other article on a mounting member forming a part of a vehicle-mounted equipment carrier.
Figure 10:
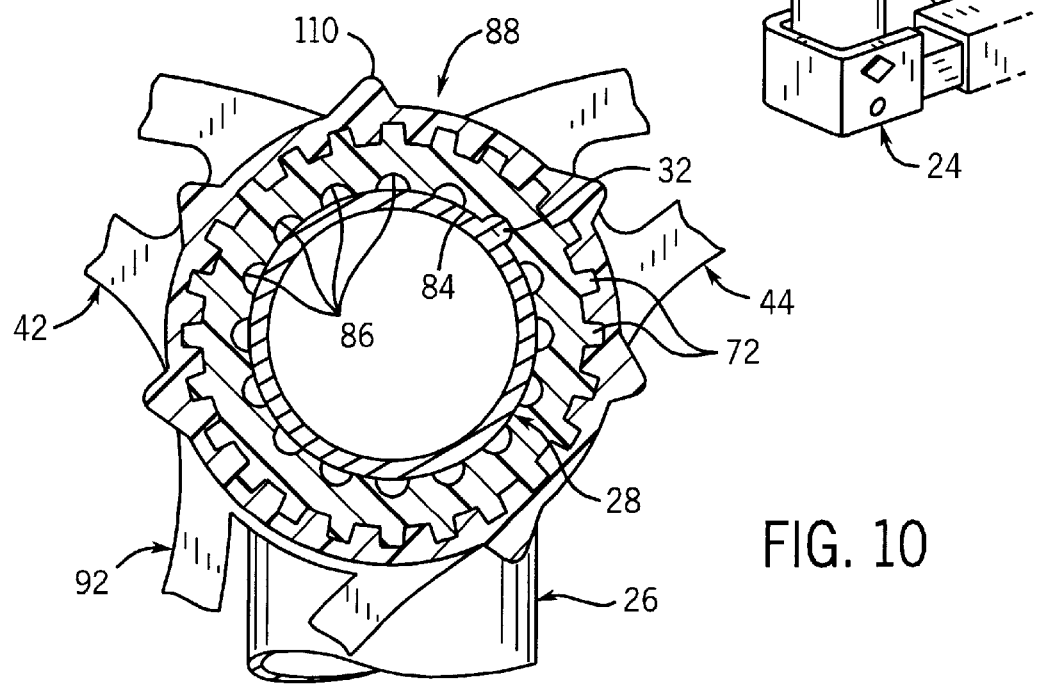
FIG. 10 is a section view, with reference to line 10—10 of FIG. 1, illustrating the support assembly of the invention as secured to the mounting member of the vehicle-mounted carrier.
Figure 2:
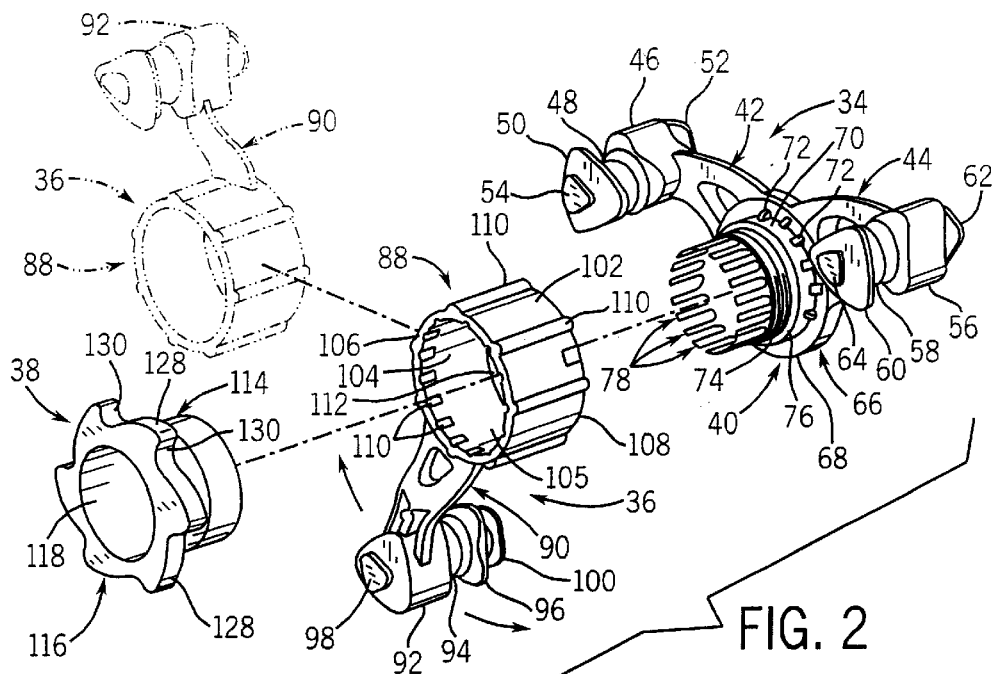
FIG. 2 is an exploded isometric view of the support assembly of FIG. 1.

Referring to FIGS. 1 and 2, a support assembly 20 constructed according to the invention is adapted for use to mount a bicycle, skis, or other articles to a vehicle-mounted carrier, shown generally at 22. In accordance with known construction, carrier 22 includes a hitch mounting section 24 adapted for engagement with a vehicle hitch 25, an upright member 26 extending upwardly from hitch mounting section 24, and a mounting section or member 28 extending rearwardly from the upper end of upright member 26 to define an inverted L-shape. Upright member 26 and mounting member 28 are preferably formed integrally with each other of a bent length of metal tubing. An end cap 30, which may be a reflector or a light, is engaged within the open rearward end of mounting member 28, and an outwardly extending axial rib 32 is formed on the outer wall of mounting member 28. While the drawings illustrate a single rib 32, it is understood that multiple, radially spaced ribs may be formed on mounting member 28. Hitch mounting section 24, upright member 26 and mounting member 28 are of known construction, and are available from Graber Products, Inc. of Madison, Wis. under the designation B.A.T. RACK, No. 998 Series.

Support assembly 20 generally includes a primary or first support member 34, a secondary or second support member 36, and a locking member 38, which coact with each other in a manner to be explained to support an article such as a bicycle or the like on mounting member 28 of carrier 22.

First support member 34 includes a central hub section 40 and a pair of arms 42, 44 extending outwardly from hub section 40. In a preferred form, hub section 40 and arms 42 are molded integrally with each other in an injection molding process utilizing a thermoplastic material such as nylon, although it is understood that other forming methods and materials may be employed.

Arm 42 terminates in an outer end which includes a support block 46. In a known manner, support block 46 is overmolded onto the end of arm 42 utilizing a soft resinous material such as is available from DuPont under the designation DYNAFLEX. Again, it is understood that support block 46 may be formed of other materials and may be engaged with arm 42 in any manner, such as in a one-piece molding process or by forming support block 46 separately and utilizing mechanical fasteners to secure support block 46 to arm 42. Support block 46 defines a peripheral recess or groove 48 and an outer end section 50. A retainer tab 52 extends outwardly from the vertical surface of support block 46, and a retainer tab 54 extends outwardly from end section 50.

Likewise, arm 44 includes a support block 56 at its outer end, defining a recess or groove 58 and an end section 60. Retainer tabs 60, 62 extend from block 56 and end section 60, respectively. The above discussion as to the materials and construction of arm 42 and support block 46 apply equally to arm 44 and support block 56. Grooves 48, 58 of support blocks 46, 56, respectively, define engagement or support areas which are in fixed positions relative to each other, and which are adapted to support a bicycle or the like in a manner to be explained.

Hub section 40 of first support member 34 defines a rear ring section 66 including a radial wall 68 which is coplanar with arms 42, 44, and an axial wall 70 extending from radial wall 66. A series of radially spaced protrusions 72 extend outwardly at the intersection of radial wall 68 and axial wall 70. An externally threaded ring 74 extends from the end of axial wall 70, and a shoulder 76 is located between axial wall 70 and threaded ring 74. A series of radially spaced, axially extending fingers 78 extend from threaded ring 74.

Figure 8:
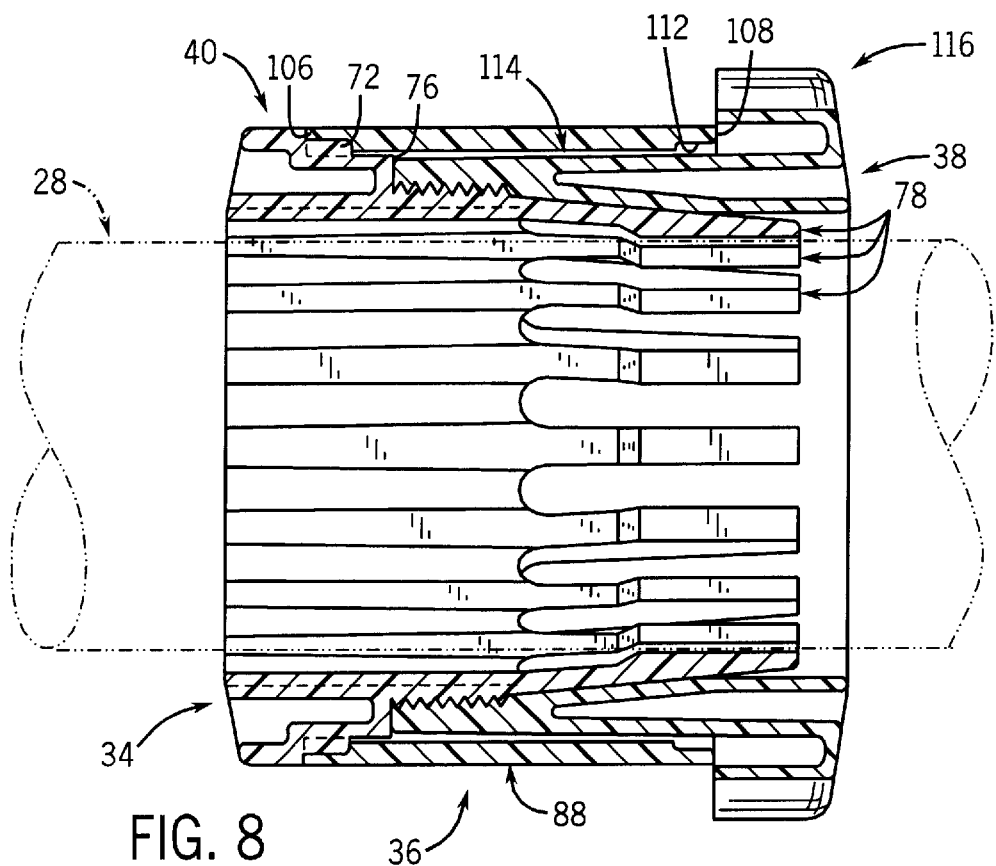
FIG. 8 is an enlarged partial section view taken along line 8—8 of FIG. 3.
Figure 9:
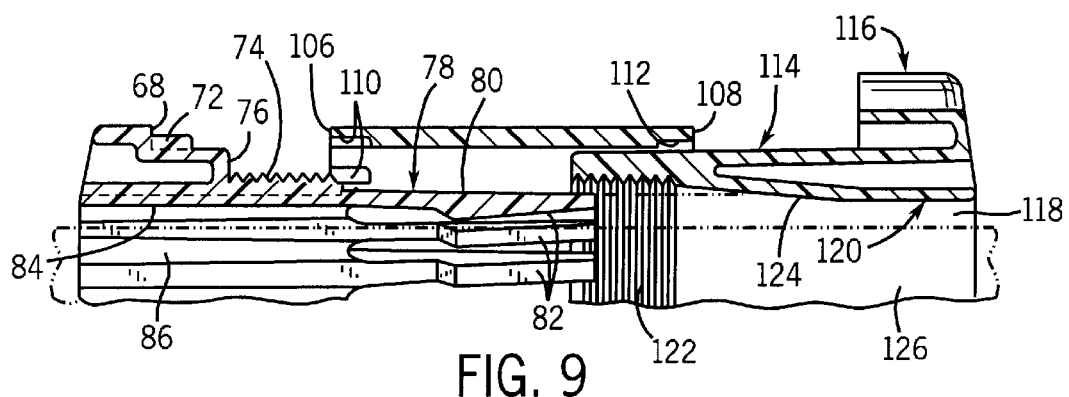
FIG. 9 is a partial section view showing the components of FIG. 8 moved apart from each other.

With reference to FIGS. 8 and 9, hub section 40, including ring section 66 and threaded ring 74, defines an internal passage 84 which is sized so as to enable carrier mounting member 28 to be received therewithin. Each locking finger 78 includes a tapered outer surface 80 and an inner contact surface 82. In a normal, inoperative position as illustrated in FIG. 9, locking fingers 80 are biased to a position in which contact surfaces 82 are moved away from the outer surface of carrier mounting member 28. In this manner, first support member 34 can be engaged with carrier mounting member 28 by inserting carrier mounting member 28 into and through passage 84 and sliding first support member 34 along carrier mounting member 28.

A series of grooves or channels 86 are formed in passage 84. Each groove 86 is adapted to receive the one or more ribs 32 on carrier mounting member 28 when first support member 34 is slid onto carrier mounting member 28, for non-rotatably mounting first support member 34 to carrier mounting member 28 in one of a series of predetermined angular positions.

Referring to FIG. 2, second support member 36 includes a hub section 88 and an arm 90 extending outwardly from hub section 88. Hub section 88 and arm 90 are preferably formed integrally with each other in an injection molding process utilizing a thermoplastic material such as nylon, although it is understood that other forming methods and materials may be employed.

Arm 90 includes a support block 92 at its outer end, which defines a groove 94 and an end section 96. A retainer tab 98 extends from block 92, and a retainer tab 100 extends from end section 96. The above discussion as to the materials and construction of arm 42 and support block 46 apply equally to arm 90 and support block 92. Groove 94 of support block 92 defines an engagement or support area which, in a manner to be explained, is capable of movement relative to the engagement or support areas defined by support blocks 46, 56, and which is adapted to support a bicycle or the like.

Hub section 88 of second support member 36 has a ring-like construction, defining an outer wall 102, an inner wall 104, and a pair of end surfaces 106, 108. A series of axial ribs 110 extend outwardly from outer wall 102. Inner wall 104 defines a passage 105, and a series of radially spaced recesses 110 are formed in inner wall 104 at the intersection of inner wall 104 with end surface 106. An annular recess 112 is formed in inner wall 104 at the intersection of inner wall 104 with end surface 108.

Arm 90 extends from hub section 88 at the end of hub section 88 adjacent end surface 106. Arm 90 is curved to provide an axial offset of block 92 and groove 94.

As shown in FIG. 2, second support member 36 is engageable with first support member 34 in a first orientation, shown in solid lines in FIG. 2 in which arm 90 is located forwardly and block 90 extends rearwardly, as well as in a second orientation as shown in phantom in FIG. 2 in which arm 90 is located rearwardly and block 92 extends forwardly. In either orientation, locking fingers 78 and locking ring 74 are received within passage 105 of hub section 88 defined by inner wall 104. When second support member 36 is in its second orientation, recesses 110 receive protrusions 72 so that arm 90 is in one of a series of predetermined positions relative to arms 42 and 44. When second support member 36 is in its first orientation, protrusions 72 are received within annular recess 112 formed at the intersection of end surface 108 with inner wall 104. When in this orientation, hub section 88 of second support member 36 can be rotated freely relative to first support member 34, so that arm 90 can be placed in any angular orientation relative to arms 42 and 44.

Figure 4:
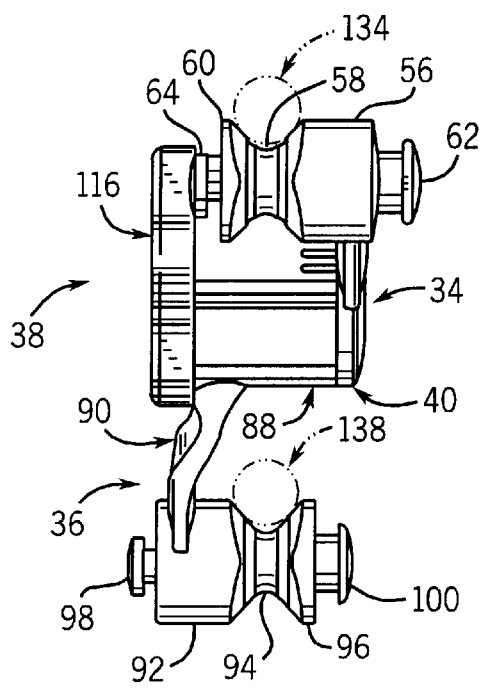
FIG. 4 is a section view taken along line 4—4 of FIG. 3.
Figure 6:
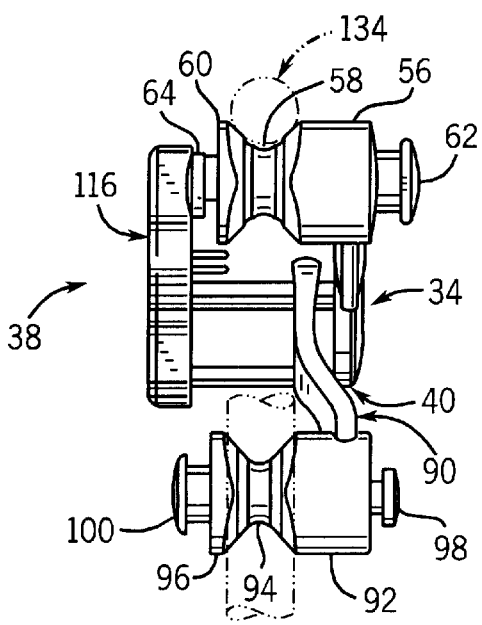
FIG. 6 is a side elevation view with reference to line 6—6 of FIG. 5.

As shown in FIGS. 4 and 6, arm 90 and block 92 are configured and arranged such that, when second support member 36 is engaged with first support member 34 in either its first orientation or its second orientation, groove 94 of support block 92 is aligned with grooves 48 and 58 of support blocks 46 and 56, respectively.

Referring to FIGS. 2, 8 and 9, locking member 38 includes a collar section 114 and an outwardly extending manually engageable rim section 116. Locking member 38 is preferably formed in an injection molding process utilizing a thermoplastic material such as nylon, although it is understood that other forming methods and materials may be employed. A passage 118 extends through collar section 114 and rim section 116, and is sized such that carrier mounting member 22 can be received within passage 118. An inner wall 120 of locking member 38 defines passage 118 and includes a threaded section 122 at the end of locking member 38 opposite rim section 118. Inner wall 120 further defines a tapered engagement wall or section 124 located rearwardly of threaded section 122. Inner wall 120 terminates in a straight-sided rear end wall or section 126.

Collar section 114 has an outside diameter slightly less than the inside diameter of second support member 36 defined by passage 105, such that collar section 114 can be received within passage 105 as shown in FIGS. 8 and 9. Rim section 116 of locking member 38 defines a series of lobes, each of which includes an arcuate engagement surface 128 and a substantially radial engagement surface 130.

In operation, support assembly 20 functions as follows to support a an article on carrier mounting member 28. As shown, the article supported by support assembly 20 is a bicycle which includes a frame 132 having a cross tube 134, a down tube 136 and a diagonal tube 138. It should be understood, however, that support assembly 20 may be used to support various articles or equipment other than a bicycle, and that the following description illustrates the manner in which support assembly 20 can be used to support any type of article on carrier mounting member 28.

Figure 3:
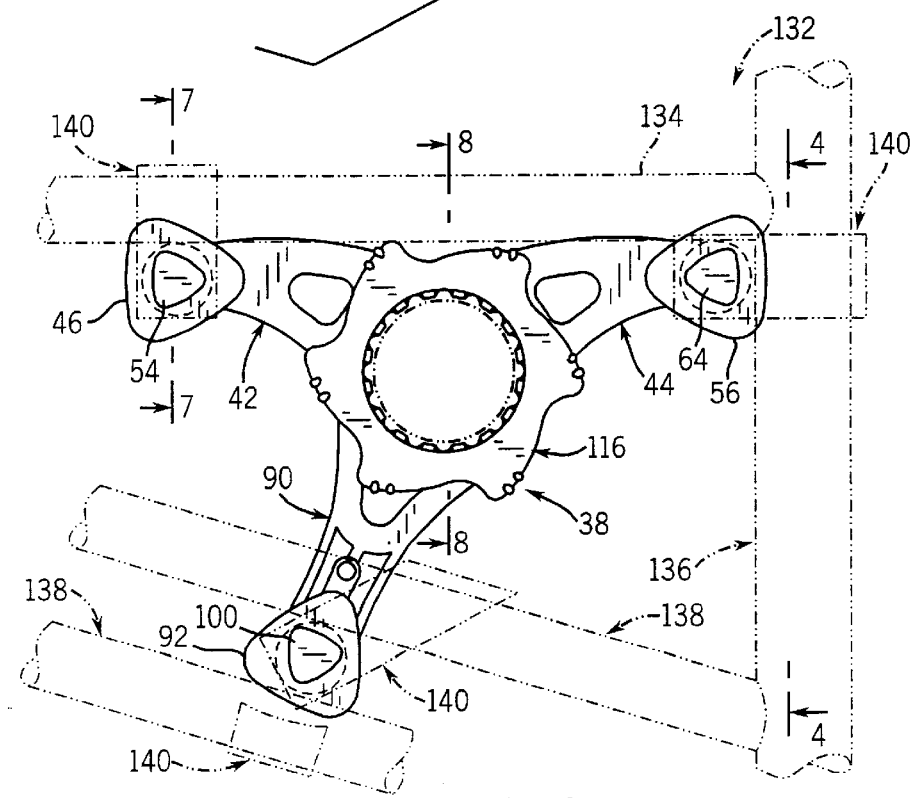
FIG. 3 is an elevation view illustrating the support assembly of FIGS. 1 and 2, showing one configuration of the support assembly components for supporting a bicycle.

Initially, first support member 34 is engaged with carrier mounting member 28 as described above, by inserting carrier mounting member 28 through passage 84. First support member 34 is positioned such that blocks 46 and 56 are in a desired position according to the article component, such as bicycle frame cross tube 132 (FIG. 3) which is intended to be supported by blocks 46 and 56. In the installation as shown in FIG. 3, blocks 46 and 56 are substantially horizontal, so as to engage cross tube 132, which is substantially horizontal. First support member 34 is positioned as described and then slid onto carrier mounting member 28 such that rib 32 is received within the appropriate one of grooves 86, so as to fix the angular position of first mounting member 34 relative to carrier mounting member 28.

Second support member 36 is then slid into engagement with hub section 40 of first mounting member 34 as described previously. Second support member 36 is positioned such that either end surface 106 or end surface 108 faces radial wall 68 of hub section 40, depending upon whether the user wishes to secure second support member 36 in one of the predetermined positions as determined by engagement of protrusions 72 within recesses 112, or wishes to provide free rotation of second support member 36 relative to first support member 34. Either way, hub section 88 of second support member 36 is positioned such that locking fingers 78 and threaded ring 74 are received within passage 105 defined by hub section 88. Locking member 38 is then inserted through passage 105, as shown in FIG. 9, and threaded section 122 is moved into engagement with threaded ring 74 of first support member 34. This initial engagement of threaded section 122 with threaded ring 74 loosely secures first support member 34, second support member 36 and locking member 38 together, while enabling hub section 88 of second support member 36 to be moved axially between locking member rim section 116 and radial wall 68 of first support member hub section 40. In this manner, the angular position of arm 90 and block 92 can be adjusted relative to arms 42, 44 and blocks 46, 56, respectively. The user then positions the article to be supported, such as a bicycle having frame 132, such that cross tube 134 is received within grooves 48, 58 of blocks 46, 56, respectively, as shown in FIG. 3. Bicycle frame 132 is preferably positioned such that block 56 is located at the intersection of cross tube 134 with down tube 136. The angle of arm 90 is then adjusted as described, to provide engagement of block 92 with another of the bicycle frame members, such as diagonal tube 138. As shown in FIG. 3, block 92 may be located either below diagonal tube 138 or above diagonal tube 138, depending upon the size and configuration of frame 132. When second support member 36 is properly positioned such that diagonal tube 138 is received within and cradled by recess 94 and cross tube 134 is received within and cradled by recesses 48, 58, the user turns locking member 38 so as to advance the threaded engagement of threaded section 122 with threaded ring 74 and move locking member 38 toward first support member 34. Continued advancement of locking member 38 in this manner results in locking member 38 attaining the position of FIG. 8, in which hub section 88 of second support member 36 is clamped between locking member rim section 116 and radial wall 68. When second support member 36 is positioned such that recesses 110 receive protrusions 72, such clamping of hub section 88 prevents axial movement of hub section 88 to maintain protrusions 72 within recesses 110 and to prevent rotation of second support member 36. When second support member 36 is positioned such that protrusions 72 are received within annular recess 112, the frictional engagement of locking member rim section 116 with end surface 106 and radial wall 68 with end surface 108, functions to prevent second support member 36 from rotating relative to first support member 34.

Figure 7:
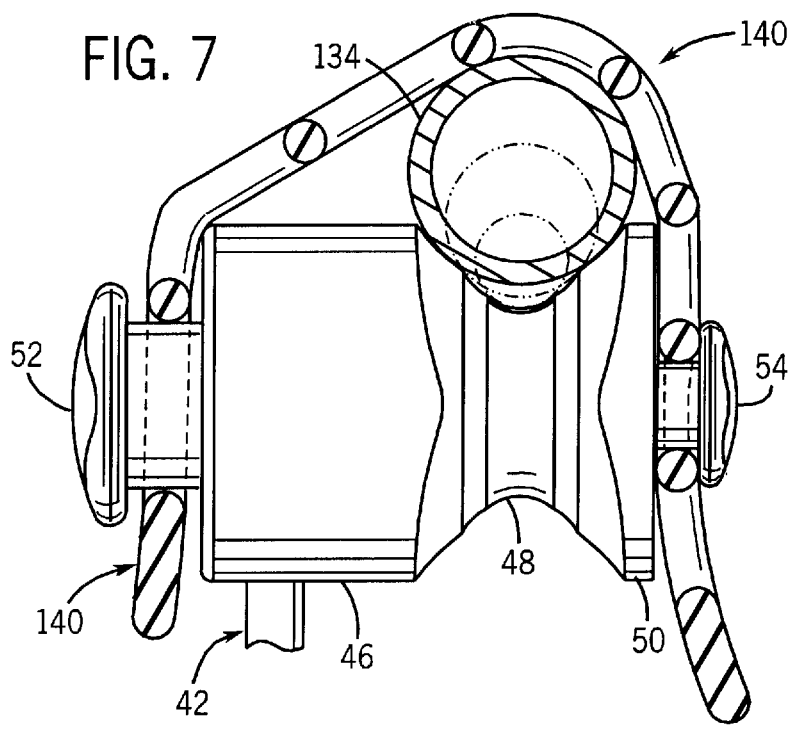
FIG. 7 is an enlarged partial section view taken along line 7—7 of FIG. 3.

Ladder-type resilient retainer straps, such as 140 (FIG. 7), are engaged with retainer tabs 52, 54 of block 46, retainer tabs 62, 64 of block 56, and retainer tabs 98, 100 of block 92 about the respective frame components 134, 136 and 138, so as to securely engage bicycle frame 132 with support assembly 20. The engagement of bicycle frame 132 with block 92 at a location spaced vertically from the support areas provided by blocks 46, 56, provides stability to prevent bicycle frame 132 from swaying about cross tube 134 during movement of the vehicle.

As locking member 38 is advanced toward radial wall 68 as described above, engagement wall 124 of locking member 38 comes into contact with ramped outer surfaces 80 of locking fingers 78, to move locking fingers 78 inwardly toward the outer surface of carrier mounting member 28. Continued advancement of locking member 38 in this manner further urges locking fingers 78 radially inwardly, as shown in FIG. 8, deflecting locking fingers 78 such that inner contact surfaces 82 of locking fingers 78 engage the outer surface of carrier mounting member 28. In this manner, frictional engagement of contact surfaces 82 with carrier mounting member 28 functions to secure support assembly 20 to carrier mounting member 28 and to prevent axial movement of support assembly 28 on carrier mounting member 28. Locking member 38 thus provides the dual function of securing second support member 36 in a predetermined angular position relative to first support member 34, and securing first support member 34, and thereby support assembly 20, to carrier mounting member 28.

While the drawings illustrate support assembly 20 secured in axial position on mounting member 28 using locking fingers 78, it is understood that support assembly 20 may also be held in position in any other manner, such as by use of a set screw or the like.

Figure 5:
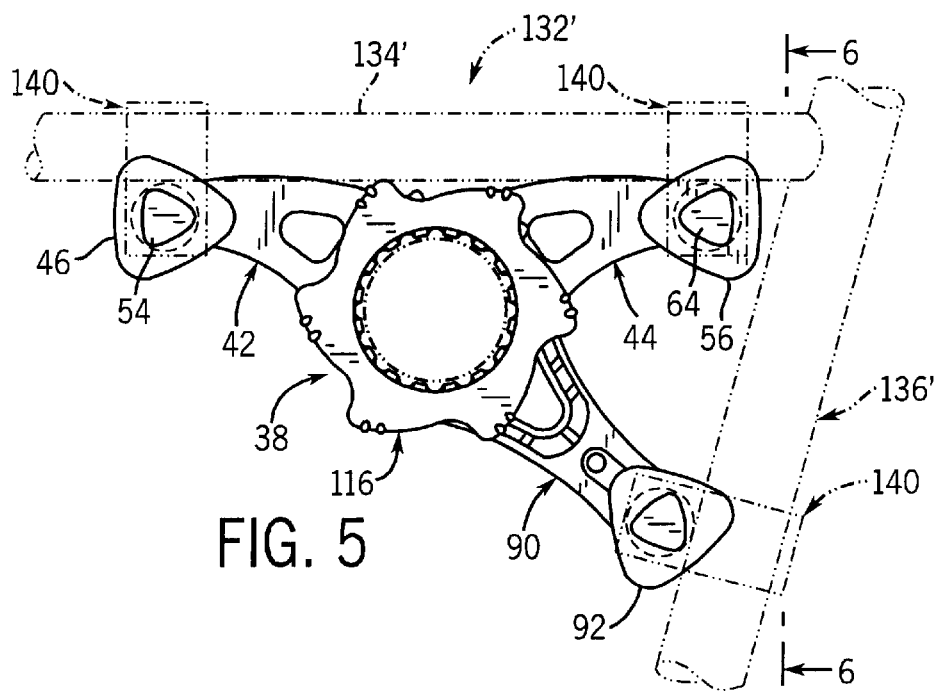
FIG. 5 is a view similar to FIG. 3, showing another configuration of the support assembly components for engaging a differently configured bicycle frame.

FIGS. 5 and 6 illustrate an alternative mounting of second support member 36 to first support member 34 so as to support a different style of bicycle frame, such as 132'. In this version, blocks 46 and 56 support an upper cross tube 134', in the same manner as described previously with respect to upper cross tube 134. Second support member 36 is positioned such that arm 90 extends toward an angled down tube 136', which is received within groove 94 of block 92. Ladder-type straps 140 are then engaged with blocks 46, 56 and 92 in the same manner as described previously, to secure cross tube 134' to blocks 46, 56 and down tube 136' to block 92.

Figure 11:
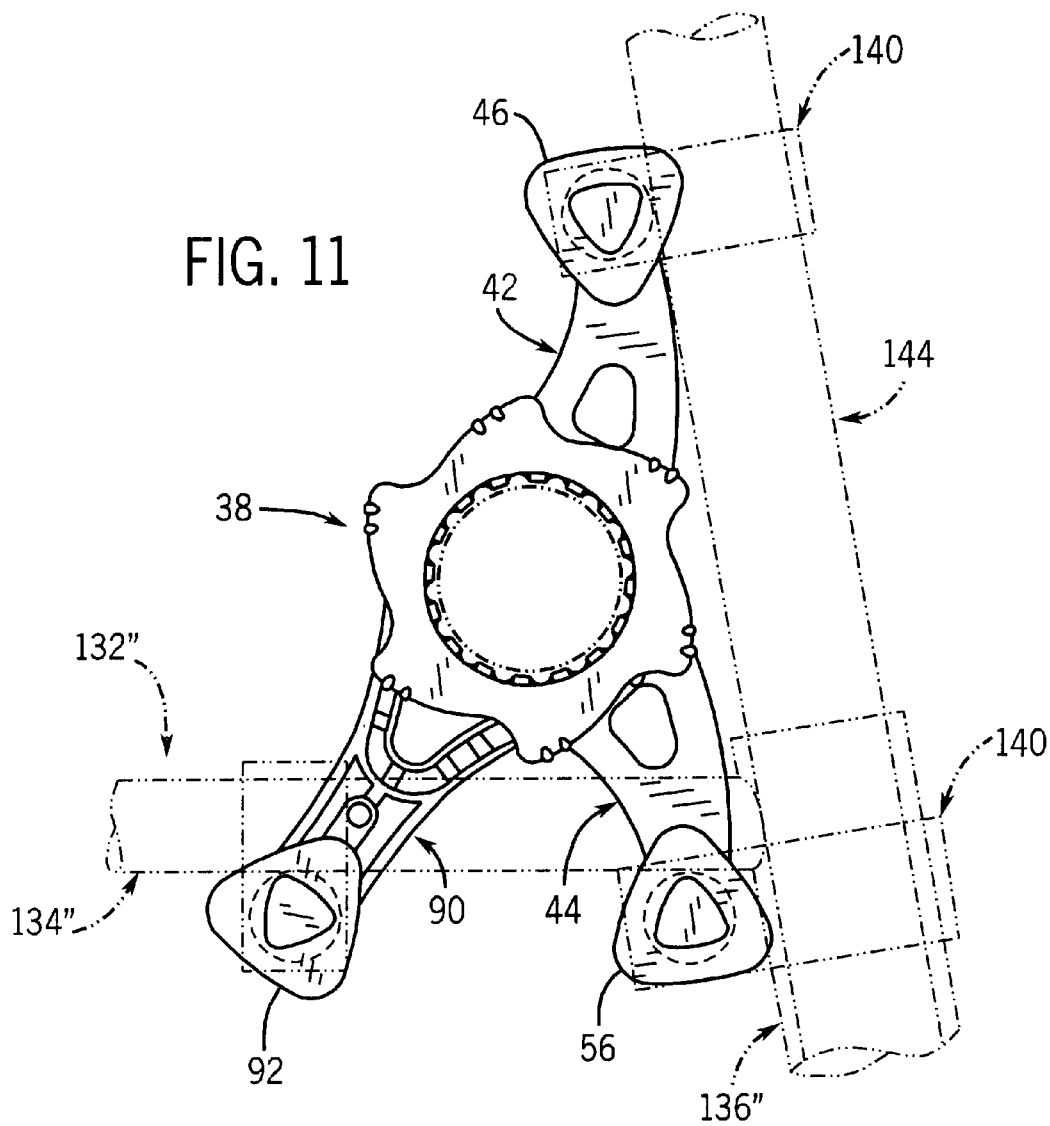
FIG. 11 is a view similar to FIGS. 3 and 5, illustrating another arrangement of the support assembly components for supporting a differently configured bicycle frame.

FIG. 11 illustrates another configuration for support assembly 20, to support a differently configured bicycle frame shown at 134", which includes a cross tube 134" and an upwardly extending member, such as a seat post 144 extending upwardly from the upper end of a down tube 136". In this version, first support member 34 is positioned such that arms 42, 44 extend generally vertically or at a slight angle to vertical. Second support member 36 is then rotated so that block 92 is generally in horizontal alignment with block 56, with block 46 located above blocks 56 and 92. Cross tube 134" is then positioned within and cradled by recesses 58, 94 of blocks 56, 92, respectively, and seat post 144 is received within and cradled by recess 48 of block 46. Ladder-type straps 140 are then engaged with blocks 46, 56 and 92 as described previously, about frame cross tube 134" and seat post 144. This configuration is particularly well suited for bicycle frames which have little clearance between an upper cross tube such as 134" and a lower tube therebelow, and which is insufficient to accommodate support assembly 20 within the space therebetween.

Figure 12:
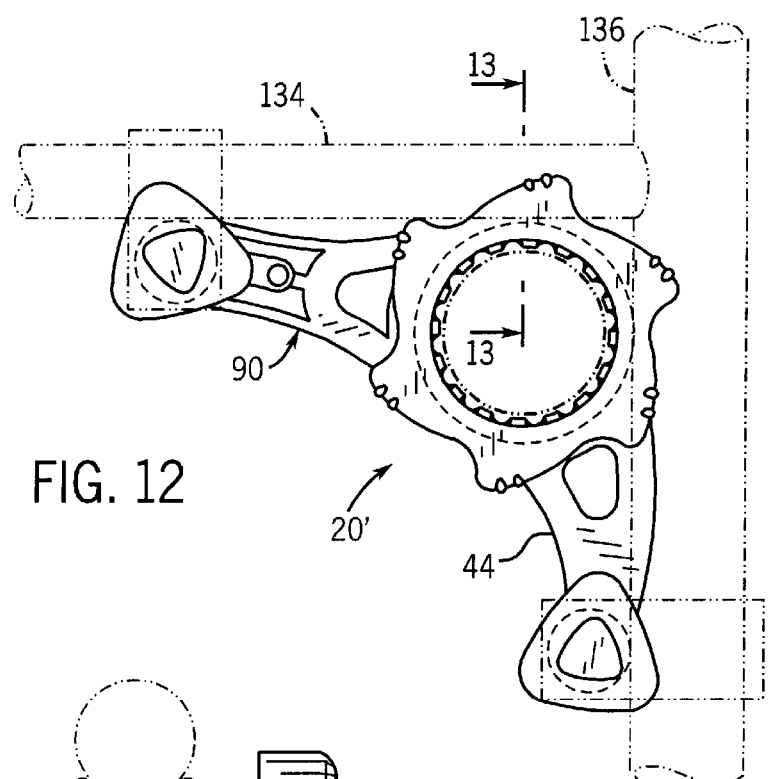
FIG. 12 is a view similar to FIGS. 3 and 5, illustrating an alternative construction of the support assembly.

FIG. 12 illustrates an alternative support assembly, shown at 20', and like reference characters will be used where possible to facilitate clarity. In this embodiment, a single arm, such as 44, extends outwardly from hub section 40 of first support member 34, and arm 42 and block 46 are eliminated. The outer surface of hub section 88 of second support member 36 is formed with a peripheral groove 146. With this arrangement, hub section 88 of second support member 36 is positioned at the intersection of a pair of frame members, such as 134, 136, which are received within groove 146. Arm 90 of second support member 36 is positioned such that groove 94 receives and cradles upper cross tube 134 in line with the upper extent of groove 146, and arm 44 is positioned such that down tube 136 is received within and cradled by groove 58 of block 56 to provide stability. Ladder-type straps 142 are then employed as described previously to engage cross tube 134 with block 92 and to engage down tube 136 with block 56. In this embodiment hub section 88 and arm 90 define a pair of support areas which are fixed in position relative to each other, and the movable third support area is provided by arm 44 and its associated block 56.

Figure 14:
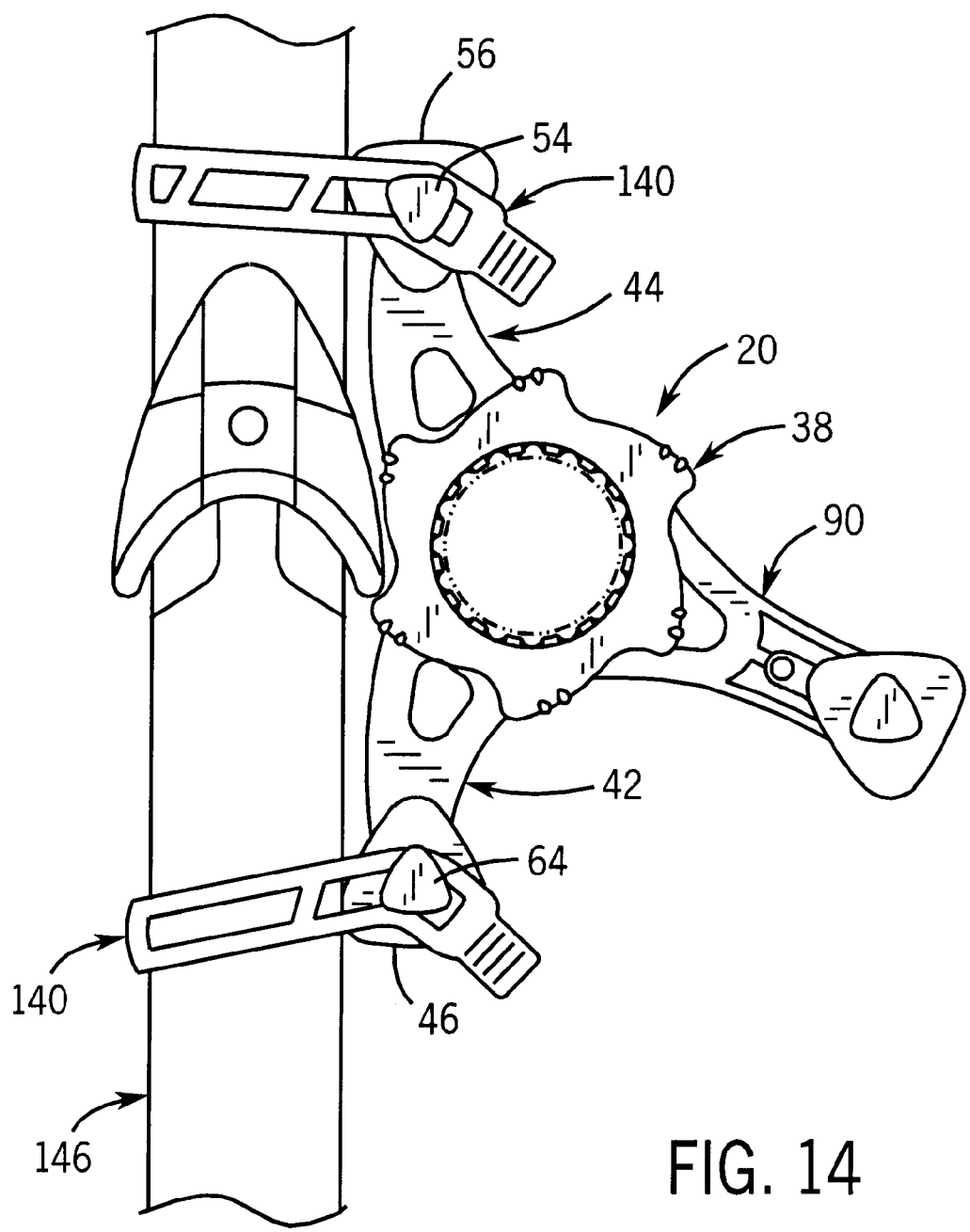
FIG. 14 is an elevation view illustrating the support assembly of FIGS. 1 and 11 used to support a pair of skis on the vehicle-mounted equipment carrier.

FIG. 14 illustrates support assembly 20 in use for supporting a pair of skis, shown at 146, on mounting member 28. In this configuration, first support member 34 is positioned substantially vertically on mounting member 28, such that support blocks 46 and 56 are located vertically in line with each other. Skis 146 are oriented edgewise into engagement with support blocks 46 and 56, and resilient retainer strips 140 are engaged with support blocks 46 and 56 about skis 146, to frictionally engage skis 146 with support blocks 46 and 56. The lower ends of skis 146 are typically received within and supported by a conventional ski basket mounted to the lower end of carrier upright member 26. In this application, second support member 36 is not used to engage skis 146, and may be moved to any derived position relative to first support member 34.

Figure 13:
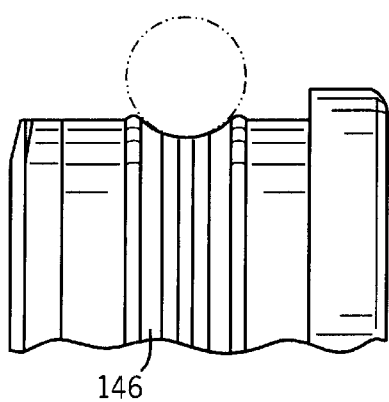
FIG. 13 is a partial section view taken along line 13—13 of FIG. 12.

While the first embodiment of the present invention has been shown and described with a pair of arms 42, 44 associated with first support member 34 and a single arm associated with second support member 36, it is understood that first support member 34 may be formed with a single arm, such as shown in FIGS. 12 and 13, and second support member 36 may be formed with a pair of arms.

It can thus be appreciated that the present invention provides a support assembly for an equipment carrier which is extremely versatile and capable of supporting various configurations of articles on the equipment carrier. The components of the support assembly can be quickly and easily removed, reconfigured and reassembled according to the type and configuration of the article to be supported.

While the drawings illustrate a single support assembly 20 engageable with carrier mounting member 28, it is understood that any number of support assemblies 20 can be secured to carrier mounting member 28. Support assemblies 20 may be spaced apart from each other on carrier mounting member 28, or may be closely packed since the component dimensions have been selected so as to provide adequate clearance between adjacent bicycles or other articles when a number of support assemblies 20 are secured to mounting member 28 in end-to-end fashion. As is well known, the length of carrier mounting member 28 can vary according to the desired number of support assemblies 20 to be mounted thereon.

The invention contemplates variations from the particular construction of support assembly 20 as shown and described. For example, while the drawings illustrate carrier mounting member 28 as part of a hitch-mounted carrier assembly, it is understood that the invention may be utilized in connection with any type of carrier having one or more outwardly extending load bearing members, which may be mounted to any part of a vehicle (such as a trunk, tailgate, spare tire, etc.). Further, while the drawings illustrate a rib 32 (which may be one of several such ribs) and a series of grooves 84 to fix the angular position of carrier assembly 20, carrier mounting member 28 may be provided with a series of radially spaced openings and support assembly 20 may include an extendible and retractable retainer pin selectively engaged with one of the openings to fix the angular position of support assembly 20. In addition, the structure of first support member 34 without arms 42, 44 and blocks 46, 56 may be provided on a separate hub member engageable with carrier mounting member and locking member 38 as described. In this embodiment, two or more angularly adjustable arms, each having a support area such as blocks 46, 56, are movable to various angular positions and secured together by engagement of the locking member with the separate hub member. It is understood that variations other than those specifically mentioned are also possible.

Various alternatives and embodiments are contemplated as being within the scope of the following claims particularly pointing out and distinctly claiming the subject matter regarded as the invention.

We claim:

1. A support assembly adapted to support an article on a vehicle-mounted equipment carrier having an outwardly extending mounting member, comprising:

a primary support member adapted for engagement with the carrier mounting member and having a pair of spaced apart fixed-position first article-engaging areas, each of which is adapted to engage the article, wherein the primary support member is configured such that the first article-engaging areas are spaced outwardly of the carrier mounting member when the primary support member is engaged with the carrier mounting member;

a secondary support member having at least one second article-engaging area;

wherein the secondary support member is engaged with the primary support member via pivotable engagement structure by which the position of the second article-engaging area can be varied relative to the first article-engaging areas, wherein the pivotable engagement structure is configured to define a pivot axis coincident with a longitudinal axis defined by the carrier mounting member; and a locking member engageable with the primary and secondary support members, wherein the locking member is operable to secure the primary and secondary support members together to fix the position of the second article-engaging area relative to the first article-engaging areas.

2. The support assembly of claim 1, wherein the primary support member includes a hub section and a pair of arm sections extending outwardly from the hub section, wherein each arm section defines one of the first article-engaging areas.

3. The support assembly of claim 2, wherein the hub section defines an opening within which the carrier mounting member is received.

4. The support assembly of claim 3, wherein the secondary support member includes a hub section and an arm section extending outwardly from the hub section and defining the second article-engaging area, wherein the hub section of the secondary support member defines an opening through which the carrier mounting member extends.

5. A support assembly adapted to support an article on a vehicle-mounted equipment carrier having an outwardly extending mounting member, comprising:

a primary support member adapted for engagement with the mounting member, wherein the primary support member includes a hub section defining an opening within which the carrier mounting member is received, and a pair of arm sections extending outwardly from the hub section, wherein each arm section defines a fixed-position first article-engaging area, each of which is adapted to engage the article, and wherein the hub section further includes outwardly biased locking structure located adjacent the carrier mounting member;

a secondary support member having at least one second article-engaging area;

wherein the secondary support member is adapted for engagement with the primary support member via variable position engagement structure by which the position of the second article-engaging area can be varied relative to the first article-engaging areas; and a locking member engageable with the primary and secondary support members, wherein the locking member is operable to secure the primary and secondary support members together to fix the position of the second article-engaging area relative to the first article-engaging areas, wherein the locking member includes engagement structure engageable with the locking structure for moving the locking structure into contact with the mounting member to secure the support assembly to the mounting member.

6. The support assembly of claim 5, wherein the locking member and the primary support member include mating threads, wherein threaded engagement of the locking member with the primary support member is operable to engage the engagement structure of the locking member with the locking structure of the hub section.

7. A support assembly adapted to support an article on a vehicle-mounted equipment carrier having an outwardly extending mounting member, comprising:

a primary support member adapted for engagement with the mounting member, wherein the primary support member includes a hub section defining an opening within which the carrier mounting member is received, and a pair of arm sections extending outwardly from the hub section, wherein each arm section defines a fixed-position first article-engaging area, each of which is adapted to engage the article;

a secondary support member having at least one second article-engaging area, wherein the secondary support member includes a hub section and an arm section extending outwardly from the hub section and defining the second article-engaging area, wherein the hub section of the second support member defines an opening through which the carrier mounting member extends, and wherein the secondary support member is adapted for engagement with the primary support member via variable position engagement structure by which the position of the second article-engaging area can be varied relative to the first article-engaging areas, wherein the variable position engagement structure comprises mating positioning structure associated with the hub sections of the primary and secondary support members for selectively fixing the position of the secondary support member in one of a plurality of predetermined positions relative to the primary support member; and a locking member engageable with the primary and secondary support members, wherein the locking member is operable to secure the primary and secondary support members together to fix the position of the second article-engaging area relative to the first article-engaging areas.

8. The support assembly of claim 7, wherein the hub section of the secondary support member is engageable with the hub section of the primary support member in a first orientation providing operation of the mating positioning structure for selectively fixing the position of the secondary support member in one of the plurality of predetermined positions relative to the primary support member, and in a second orientation rendering the mating positioning structure inoperable whereby the secondary support member can be positioned in any desired position relative to the primary support member.

9. A support assembly adapted to support an article on a vehicle-mounted equipment carrier having an outwardly extending mounting member, comprising:

a primary support member adapted for engagement with the mounting member, wherein the primary support member includes a hub section defining an opening within which the carrier mounting member is received, and a pair of arm sections extending outwardly from the hub section, wherein each arm section defines a fixed-position first article-engaging area, each of which is adapted to engage the article;

a secondary support member having at least one second article-engaging area, wherein the secondary support member includes a hub section and an arm section extending outwardly from the hub section and defining the second article-engaging area, wherein the hub section of the second support member defines an opening through which the carrier mounting member extends, and wherein the secondary support member is adapted for engagement with the primary support member via variable position engagement structure by which the position of the second article-engaging area can be varied relative to the first article-engaging areas;

wherein the hub section of the secondary support member is engageable with the hub section of the primary support member in a first orientation and a second orientation, wherein the second article-engaging area of the secondary support member is substantially aligned with the first article-engaging areas of the primary support member when the secondary support member is in either the first orientation or the second orientation; and a locking member engageable with the primary and secondary support members, wherein the locking member is operable to secure the primary and secondary support members together to fix the position of the second article-engaging area relative to the first article-engaging areas.

10. A support assembly adapted to support an article on a vehicle-mounted equipment carrier having an outwardly extending mounting member, comprising:

a primary support member adapted for engagement with the mounting member, wherein the primary support member includes a hub section defining an opening within which the carrier mounting member is received, and a pair of arm sections extending outwardly from the hub section, wherein each arm section defines a fixed-position first article-engaging area, each of which is adapted to engage the article;

a secondary support member having at least one second article-engaging area;

wherein the secondary support member is adapted for engagement with the primary support member via variable position engagement structure by which the position of the second article-engaging area can be varied relative to the first article-engaging areas; and a locking member engageable with the primary and secondary support members, wherein the locking member is operable to secure the primary and secondary support members together to fix the position of the second article-engaging area relative to the first article-engaging areas;

wherein the carrier mounting member includes an axial rib, and wherein the hub section of the primary support member includes a plurality of radially spaced grooves, each of which is adapted to selectively receive the rib for securing the primary support member to the carrier mounting member in one of a plurality of predetermined angular positions.

11. A support assembly adapted to support an article on a vehicle-mounted equipment carrier having an outwardly extending mounting member, comprising:
   a first support member including a first hub section and one or more first support arms extending outwardly therefrom, wherein the first hub section includes an opening adapted to receive the mounting member and wherein each first support arm is adapted to engage the article;
   a second support member including a second hub section and one or more second support arms extending outwardly therefrom, wherein the second hub section includes an opening and is engageable with the first hub section, and wherein each second support arm is adapted to engage the article, wherein the second hub section is engageable with the first hub section in varying angular positions so as to vary the angular relationship between the first and second support arms; and
   a locking member having an opening and engageable with the first and second hub sections, wherein the locking member is operable to secure the first and second hub sections together to fix the angular relationship between the first and second support arms.

12. The support assembly of claim 11, wherein one of the hub sections includes outwardly biased locking structure adjacent the opening and wherein the locking member includes engagement structure engageable with the locking structure upon engagement of the locking member with the first and second hub sections, for moving the locking structure into contact with the carrier mounting member to fix the position of the support assembly relative to the carrier mounting member.

13. The support assembly of claim 12, wherein the outwardly biased locking structure includes a plurality of radially spaced axially extending fingers, each of which defines an outwardly facing ramped surface, and wherein the engagement structure of the locking member comprises a mating ramped surface which engages the ramped surfaces of the fingers to move the fingers inwardly into contact with the carrier mounting member.

14. The support assembly of claim 13, wherein the locking member is engageable with the first hub section through the opening of the second hub section, and wherein the locking member and the first hub section include mating threads for providing engagement of the locking member with the first hub section, and wherein the second hub section is interposed between and engageable with the locking member and the first hub section when the locking member is engaged with the first hub section.

15. The support assembly of claim 11, wherein the locking member and the first hub section include mating threads for providing engagement of the locking member with the first hub section, and wherein the second hub section defines first and second oppositely facing end areas, wherein the first end area engages the locking member and the second end area engages the first hub section when the locking member is engaged with the first hub section.

16. The support assembly of claim 15, wherein the second hub section is reversible such that the first end area engages the hub section and the second end area engages the locking member when the locking member is engaged with the first hub section.

17. The support assembly of claim 16, wherein the first and second support arms include article-engaging areas which are substantially coplanar when the second hub section is oriented in either a first orientation, in which the first end area engages the locking member-and the second end area engages the first hub section, or a second orientation in which the first end area engages the first hub section and the second end area engages the locking member.

18. A support assembly for supporting an article on a vehicle-mounted equipment carrier having an outwardly extending mounting member, comprising:
   at least one article support member including a mounting section and article support structure, wherein the mounting section defines an opening adapted to receive the carrier mounting member, wherein the mounting section includes outwardly biased locking structure at the opening located adjacent the carrier mounting member; and
   a locking member engageable with the mounting section of the article support member, wherein the locking member includes engagement structure engageable with the locking structure for moving the locking structure into contact with the carrier mounting member to secure the article support member to the carrier mounting member.

19. The support assembly of claim 18, wherein the at least one article support member comprises first and second article support members, wherein the mounting section of each article support member comprises a hub section and wherein the article support structure of each article support member comprises one or more arm members extending outwardly from the hub section.

20. The support assembly of claim 19, wherein the locking member is engageable with the hub section of the first article support member via mating threads provided on the locking member and the hub section of the first article support member.

21. The support assembly of claim 20, wherein the second article support member is disposed between and is engaged with the locking member and the first article support member when the locking member is threadedly engaged with the first article support member.

22. The support assembly of claim 21, wherein the outwardly biased locking structure comprises a series of radially spaced axially extending fingers provided on the hub section of the first article support member and located within a passage defined by the hub section of the second article support member.

23. The support assembly of claim 22, wherein each finger includes an outwardly facing ramped engagement area, and wherein the engagement structure of the locking member comprises an inwardly facing ramped surface provided on the locking member which is engageable with the outwardly facing ramped engagement areas of the fingers upon engagement of the locking member with the hub section of the first article support member, for moving the fingers inwardly into contact with the carrier mounting member.

24. A support assembly for supporting an article on an axially extending mounting member of an equipment carrier, comprising:
   first support means for supporting the article at first and second spaced locations which are in a fixed angular relationship relative to each other, wherein the first support means is adapted for mounting to the mounting member of the equipment carrier, wherein the first support means is configured such that the first and second spaced locations are located outwardly of the mounting member of the equipment carrier when the first support means is mounted thereto;

second support means for supporting the article at a third location, wherein the second support means is pivotable about a pivot axis coincident with a longitudinal axis defined by the carrier mounting member, and engageable in varying positions with the first support means; and locking means engageable with the first and second support means for fixing the position of the first and second support means relative to each other and for securing the first and second support means to the equipment carrier.

25. A support assembly for supporting an article on an equipment carrier, comprising:

first support means for supporting the article at first and second spaced locations which are in a fixed angular relationship relative to each other, wherein the first support means is adapted for mounting to the equipment carrier;

second support means for supporting the article at a third location, wherein the second support means is engageable in varying positions with the first support means; and locking means engageable with the first and second support means for fixing the position of the first and second support means relative to each other and for securing the first and second support means to the equipment carrier, wherein the locking means is engageable with the first and second support means via a threaded connection of the locking means with the first support means.

26. The support assembly of claim 25, wherein the second support means includes a hub section defining a passage through which the locking means extends into engagement with the first support means, wherein the hub section of the second support means is engaged with both the locking means and the first support means when the locking means is threadedly secured to the first support means.

27. The support assembly of claim 26, wherein the second support means includes an arm extending outwardly from the hub section, and wherein the arm includes an article engagement area for supporting the article at the third location, and wherein the first support means includes a hub section with which the locking means is engageable, and wherein the first support means further includes a pair of arms extending outwardly from the hub section, wherein the arms include article engagement areas for supporting the article at the first and second spaced locations.

28. The support assembly of claim 25, wherein the first support means and the locking means each include a passage through which a mounting member of the equipment carrier extends.

29. The support assembly of claim 28, wherein one of the locking means and the first support means includes a series of radially spaced axially extending fingers located adjacent the carrier mounting member, wherein the fingers are biased outwardly away from the carrier mounting member, and wherein the other of the first support means and the locking means includes engagement structure for moving the fingers inwardly into contact with the carrier mounting member upon threaded engagement of the locking means with the first support means for frictionally engaging the fingers with the carrier mounting member to secure the first and second support means to the equipment carrier.

30. A method of securing a support assembly to a vehicle-mounted equipment carrier having a mounting member, comprising the steps of:

engaging a first support member with the carrier mounting member, wherein the first support member includes a pair of spaced apart first article-engaging areas, each of which is located outwardly of the carrier mounting member;

pivotably engaging a second support member with the first support member, wherein the second support member includes one or more second article-engaging areas; and securing the first and second support members together; and securing the support members to the carrier mounting member, wherein the pivotable engagement of the second support member with the first support member provides pivotable movement of the second support member about a pivot axis coincident with a longitudinal axis defined by the carrier mounting member.

31. The method of claim 30, wherein the step of engaging the first support member with the mounting member is carried out by inserting the mounting member through a passage defined by the first support member.

32. The method of claim 31, wherein the step of engaging the second support member with the first support member is carried out by inserting the carrier mounting member through a passage defined by the second support member and moving the second support member into engagement with the first support member.

33. The method of claim 32, wherein the step of securing the first and second support members together is carried out by securing a locking member to the first support member, wherein the locking member extends through the passage of the second support member into engagement with the first support member and wherein the locking member includes structure for engaging the second support member when the locking member is engaged with the first support member so as to secure the second support member in position relative to the first support member.

34. A method of securing a support assembly to a vehicle-mounted equipment carrier having a mounting member, comprising the steps of:

engaging a first support member with the carrier mounting member by inserting the mounting member through a passage defined by the first support member, wherein the first support member includes one or more first article-engaging areas;

engaging a second support member with the first support member by inserting the carrier mounting member through a passage defined by the second support member and moving the second support member into engagement with the first support member, wherein the second support member includes one or more second article-engaging areas;

securing the first and second support members together to fix the position of the one or more second article-engaging areas relative to the one or more first article-engaging areas, by engaging a locking member with the first support member, wherein the locking member extends through the passage of the second support member into engagement with the first support member and wherein the locking member includes structure for engaging the second support member when the locking member is engaged with the first support member so as to secure the second support member in position relative to the first support member, wherein the step of engaging the locking member with the first support member is carried out by providing threaded engagement structure on the locking member and the first support member and turning the locking member so as to advance the locking member into engagement with the first support member; and securing the support members to the carrier mounting member.

35. The method of claim 33, wherein the step of engaging the second support member with the first support member is carried out so as to selectively position the one or more second article-engaging areas of the second support member in one of a plurality of angular positions relative to the one or more first article-engaging areas of the first support member.

36. The method of claim 35, wherein the step of engaging the second support member with the first support member is carried out by engaging the second support member in either a first orientation in which the second support member is movable to one of a plurality of predetermined angular positions relative to the first support member, or in a second orientation in which the second support member is freely movable to any angular position relative to the first support member.

37. A vehicle-mounted bicycle carrier, comprising:

an upright support member defining an upper end and a lower end adapted for engagement with a hitch receiver associated with the vehicle, wherein the upper end of the support member includes a single rearwardly extending mounting member defining a longitudinal axis;

a primary support member carried by the mounting member, wherein the primary support member includes a pair of spaced apart upper engagement areas, each of which is located outwardly of the mounting member, wherein the upper engagement areas are located on opposite sides of the mounting member and are adapted to engage an upper portion of a bicycle at spaced locations; and a pivotable stabilizing arm extending downwardly from the mounting member at a location between the upper engagement areas of the primary support member, wherein the stabilizing arm includes a lower engagement area adapted to engage the bicycle at a location below the upper engagement areas to prevent swinging movement of the bicycle.

38. The bicycle carrier of claim 37, wherein the stabilizing arm is pivotable about a pivot axis coincident with the longitudinal axis of the mounting member.

39. The bicycle carrier of claim 38, wherein the stabilizing arm extends from a hub which is pivotably engaged with the primary support member, wherein the hub defines an opening through which the mounting member extends.

40. The bicycle carrier of claim 39, wherein the primary support member includes a central section defining an opening through which the mounting member extends, wherein each upper engagement area is defined by a fixed-position arm extending outwardly from the central section.

41. The bicycle carrier of claim 40, wherein the hub of the stabilizing arm is pivotably engaged with the central section of the primary support member.

42. The bicycle carrier of claim 41, wherein each of the upper engagement areas defined by the fixed-positions arms is configured to provide a discrete point of contact with the upper portion of the bicycle.

43. The bicycle carrier of claim 41, wherein the stabilizing arm includes an axially offset engagement member and a strap arrangement for engagement about a portion of the bicycle.

44. A vehicle-mounted bicycle carrier, comprising:

an upright support member defining an upper end and a lower end adapted for engagement with a hitch receiver associated with the vehicle, wherein the upper end of the support member includes a single rearwardly extending mounting member defining a longitudinal axis; and a bicycle support assembly carried by the mounting member, comprising: a primary support member having a central section defining an opening adapted to receive the mounting member, and a pair of upper support arms extending outwardly in opposite directions from the central section, wherein the upper support arms are adapted to engage an upper area of the bicycle at spaced locations on opposite sides of the mounting member; and a variable position stabilizing arm extending downwardly from the central section between the pair of upper support arms, wherein the stabilizing arm is movable relative to the upper support arms and includes a lower engagement area adapted to engage the bicycle at a location below the upper support arms to prevent swinging movement of the bicycle.

45. The bicycle carrier of claim 44, wherein the stabilizing arm is pivotable relative to the support arms for pivoting movement about a pivot axis coincident with the longitudinal axis of the rearwardly extending mounting member.

46. The bicycle carrier of claim 45, wherein the central section of the primary support member comprises an inner hub and wherein the pair of upper support arms extend outwardly from the inner hub, and wherein the stabilizing arm includes an outer hub engaged with the inner hub.

47. The bicycle carrier of claim 46, further comprising a locking member engageable with the inner hub of the primary support member for securing the bicycle support assembly to the mounting member, wherein the locking member and the primary support member are configured to secure the outer hub of the stabilizing arm in position relative to the inner hub of the primary support member.

48. The bicycle carrier of claim 45, wherein each upper support arm includes:

an inner end interconnected with the central section of the primary support member;

an outer end spaced outwardly from the inner end; and a bicycle engagement member interconnected with the outer end, wherein the bicycle engagement members are spaced apart from each other and are adapted to engage the upper area of the bicycle at discrete spaced apart locations.

49. The bicycle carrier of claim 48, wherein each bicycle engagement member extends in an axial direction substantially parallel to the longitudinal axis of the mounting member from the outer end of one of the upper support arms.

50. A vehicle-mounted bicycle carrier, comprising:

an upright support member defining an upper end and a lower end adapted for engagement with a hitch receiver associated with the vehicle, wherein the upper end of the support member includes a single rearwardly extending mounting member defining a longitudinal axis; and a support assembly adapted for engagement with the mounting member, wherein the support assembly includes: a central section defining an opening adapted to receive the mounting member; a pair of fixed-position arms extending outwardly in opposite directions from the central section, wherein each of the fixed-position arms defines an upper engagement area adapted to engage an upper portion of the bicycle; and a stabilizing arm extending from the central section, wherein the stabilizing arm is pivotable to varying positions relative to the fixed-position arms and includes a lower stabilizing engagement area spaced below the upper engagement areas of the fixed-position arms, wherein the stabilizing engagement area is adapted to engage the bicycle at a location below the upper engagement areas of the fixed-position arms to prevent swinging movement of the bicycle.

51. The bicycle carrier of claim 50, wherein the stabilizing arm extends from a hub member pivotably interconnected with the central section, wherein the hub member and the central section are configured such that the stabilizing arm is pivotable about a pivot axis coincident with the longitudinal axis of the mounting member.

52. The bicycle carrier of claim 51, wherein the upper engagement area of each fixed-position arm is configured to establish discrete contact with an upper portion of the bicycle, to support the bicycle in a suspension manner therefrom.

53. The bicycle carrier of claim 52, wherein each upper engagement area extends axially from an outer end defined by its associated fixed-position arm in a direction substantially parallel to the longitudinal axis of the mounting member.

54. The bicycle carrier of claim 53, wherein the central section defines an end and wherein the fixed-position arms extend outwardly from the end of the central section, and wherein the engagement members extend from the outer ends of the fixed-position arms in a direction such that the engagement members are in alignment with the central section.

55. The bicycle carrier of claim 51, wherein the lower stabilizing engagement area of the stabilizing arm comprises a stabilizing engagement member interconnected with and extending axially from an outer end defined by the stabilizing arm, in a direction substantially parallel to the longitudinal axis of the mounting member.

56. A vehicle-mounted bicycle carrier, comprising:

an upright support member defining an upper end and a lower end adapted for engagement with a hitch receiver associated with the vehicle, wherein the upper end of the support member includes a single rearwardly extending mounting member defining a longitudinal axis; and a support assembly carried by the mounting member, comprising:

a primary bicycle support member defining an opening adapted to receive the mounting member, wherein the primary support member includes fixed-position upper bicycle engagement structure that is configured to engage and support an upper portion of the bicycle at spaced apart locations on opposite sides of the opening; and a pivotable secondary bicycle support member extending downwardly from the primary support member, wherein the secondary support member is pivotable about a pivot axis coincident with the longitudinal axis of the mounting member, and includes a lower engagement area adapted to engage the bicycle at a location below the upper bicycle engagement structure to prevent swinging movement of the bicycle.

57. The bicycle carrier of claim 56, wherein the pivotable secondary bicycle support member includes a hub and a stabilizing arm extending outwardly from the hub, wherein the lower engagement area is associated with an outer end defined by the stabilizing arm.

58. The bicycle carrier of claim 57, wherein the fixed-position upper bicycle engagement structure comprises a pair of arms extending outwardly from a central section, wherein the opening defined by the primary bicycle support member is formed in the central section.

59. The bicycle carrier of claim 58, wherein the hub of the secondary bicycle support member is pivotably interconnected with the central section of the primary bicycle support member.

60. The bicycle carrier of claim 59, further comprising a locking member for securing the secondary bicycle support member to the primary bicycle support member.

61. The bicycle carrier of claim 60, wherein the locking member is operable to interact with the central section of the primary support member to secure the support assembly to the mounting member.

62. The bicycle carrier of claim 58, wherein the primary and secondary bicycle support members are configured and arranged such that the stabilizing arm and a first one of the arms of the primary support member are configured to engage a portion of the bicycle so as to support the bicycle in a suspension manner, and such that a second one of the arms of the primary support member engages a component of the bicycle at a location vertically spaced from engagement of the bicycle by the stabilizing arm and the first one of the arms of the primary support member.

* * * * *